W. P. HAMMOND.
DUST CAP FOR VALVES OF PNEUMATIC TIRES.
APPLICATION FILED MAY 1, 1919.
1,331,060.
Patented Feb. 17, 1920.
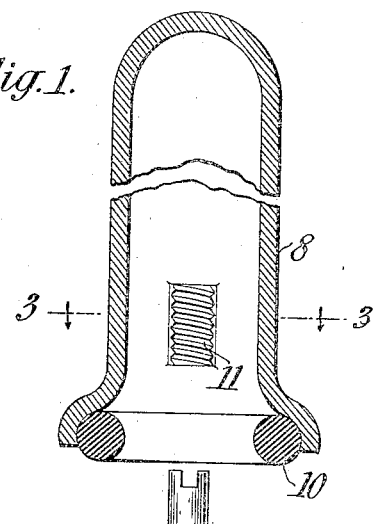
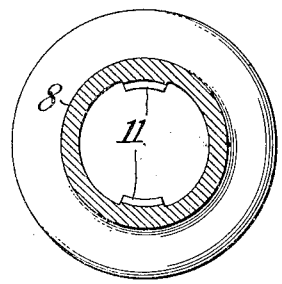
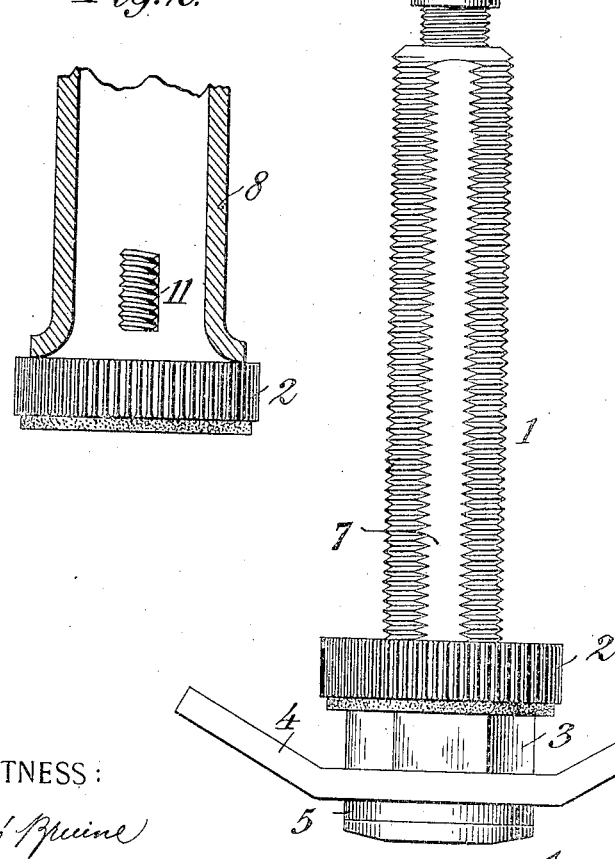
WITNESS:
René Bruine
INVENTOR:
William P. Hammond
By Attorneys,
Fraser, and T. Myers

UNITED STATES PATENT OFFICE.

WILLIAM P. HAMMOND, OF PASSAIC, NEW JERSEY, ASSIGNOR TO A. SCHRADER'S SON, INCORPORATED, OF NEW YORK, N. Y., A CORPORATION OF NEW YORK.

DUST-CAP FOR VALVES OF PNEUMATIC TIRES.

1,331,060.     Specification of Letters Patent.     Patented Feb. 17, 1920.

Original application filed August 12, 1910, Serial No. 576,847. Divided and this application filed May 1, 1919. Serial No. 293,961.

*To all whom it may concern:*

Be it known that I, WILLIAM P. HAMMOND, a citizen of the United States of America, and a resident of the city and county of Passaic, State of New Jersey, have invented certain new and useful Improvements in Dust-Caps for Valves of Pneumatic Tires, of which the following, taken in connection with the accompanying sheet of drawing, forms a complete and concise description.

This application is a division of my application filed August 12, 1910, Serial No. 576,847.

This invention relates to dust caps for pneumatic tire valves or the like, and aims to provide certain improvements therein.

To mount a dust cap as heretofore used upon a valve casing of an automobile tire requires not only considerable labor, but also quite some time, owing to the fact that the cap requires to be screwed down upon the threads of the valve casing until it engages the rim nut. This process necessitates in some instances from thirty to thirty-five complete revolutions of the cap, and when this is multiplied by four, the number of valves of each automobile, it will be apparent that the total of at least one hundred and twenty turns required before the cap is in place will consume a material amount of time. It is for this reason that not infrequently it is found that chauffeurs and owners dispense entirely with these dust caps, notwithstanding the fact that it is desirable to use them.

My invention has for an object the production of a dust cap which can be mounted upon the valve casing instantly and without trouble, merely by slipping the same over the casing and with a sliding movement envelop the same to the extent allowed by the rim securing nut, and then with a slight rotary movement lock the same in an effective holding position.

Another object of my invention is to produce a dust and water tight joint at the meeting of the cap and the rim nut, so that it will be impossible for either water or dirt to filter through the space caused by the chamfered surface of the valve casing, to the tire tube.

To the accomplishment of this, as well as other objects that will manifest themselves on reading the following specification, I will proceed to describe the illustrated embodiment of my invention, which is a preferable means of its accomplishment, not restricting myself, however, to this described means, but reserving a fair range of equivalents which may be resorted to to effect the object of my invention.

In the drawing,—

Figure 1 is a side elevation of a complete automobile tire valve and a dust cap made according to my invention in vertical section.

Fig. 2 is a view showing the dust cap in fragmentary form at a slightly different angle from Fig. 1.

Fig. 3 is a cross section on the line 3—3, Fig. 1.

Referring to the drawing, 1 indicates the complete valve as now generally used and which consists of the stem portion, securing nuts and parts 2, 3, 4 and 5, and an interior check valve mechanism (not shown) and cap 6, all of which is of usual and well known construction. The valve casing is screw-threaded along its entire longitudinal length and is provided with two chamfered or flat sides —7— formed by either cutting away the threads or by threading in the first instance a tube of like cross section.

The dust cap is indicated at —8— and is of dome shape and drawn to any desired length. In the interior peripheral surface of this cap are formed two longitudinal rows diametrically opposite each other, of grooves or screw-threads —11—, the threads being of proper length to permit the same to pass freely along the flat sides —7— of the valve casing when the cap is mounted thereon, and still of sufficient length to form a substantial engagement with the threads of the valve casing when the cap is given its partial rotary movement.

I have found in practice that it is desirable to use a resilient washer —10— between the end of the cap —8— and the rim nut —2—, in order to effect a good joinder between these parts, owing to the fact that the rim nut —2— may in some instances lap to some extent the next adjacent thread above it, due to the varying thicknesses of rims to which they are attached. The result of this is that the threads of the cap cannot pick this thread up when rotated. By using the washer —10— it is possible, owing to its resiliency which permits of sufficient amount of compression that is necessary to bring the threads on the cap into proper alinement with the lowest thread on the casing by forcing down the cap by hand. This washer further serves the purpose of obtaining greater stability of connection between the cap and the rim nut and casing. The washer —10— is mounted and retained within the flared end of the cap, as shown, so that the washer and cap may be ordinarily inseparable and sold as a unit.

I have found it desirable to make part of the threads of the cap of a different pitch or angle as shown, so that the cap when rotated into position will be arrested by these threads and cause a greater bite between them and the casing threads. When these threads are made partially with an opposite pitch or angle the cap may be slid along the casing and instead of rotating the same to the left (in the drawing) the direction in which the nut 2 is mounted and turned to position against the rim, I may give the cap a reverse turn to the right so that any loosening of the rim nut 2, due to vibration, etc., will only tend to tighten and make a more effective connection between the cap and the casing. It is understood that the construction may be such that the threads will bind when the cap is rotated in either direction to bring the threads from their position on the flat side into engagement with the threads of the valve casing. If rotated to the right (in the drawing) the distance between the cap and the rim nut will be slightly increased, but the resilient member 10 will expand to take up this slight increase in space.

While I have shown and described one form of the invention, it will be understood that I do not wish to be limited thereto since various changes may be made therein without departing from the spirit of the invention.

What I claim is:—

1. As a new article of manufacture a dust cap for pneumatic tire valves or the like comprising a tubular body provided with a plurality of disconnected threads of different pitch or angle from those of the tire valve casing.

2. As a new article of manufacture a dust cap for pneumatic tire valves or the like comprising a tubular body provided with a plurality of disconnected threads, portions of such threads being of different pitch or angle from the threads of the tire valve casing.

3. The combination with a pneumatic tire valve casing of a dust cap comprising a tubular body provided with a plurality of disconnected threads of different pitch or angle from those of the casing.

4. The combination with a pneumatic tire valve casing of a dust cap comprising a tubular body provided with a plurality of disconnected threads, portions of which are of different pitch or angle from those of the casing.

In witness whereof, I have hereunto signed my name.

WILLIAM P. HAMMOND.